United States Patent
Vander Laan et al.

(10) Patent No.: US 9,733,658 B2
(45) Date of Patent: Aug. 15, 2017

(54) CURRENT PROTECTION FOR AN ELECTRICAL DISTRIBUTION COMPONENT IN AN ELECTRIFIED VEHICLE

(71) Applicant: FORD GLOBAL TECHNOLOGIES, LLC, Dearborn, MI (US)

(72) Inventors: Kevin Vander Laan, Bloomfield Hills, MI (US); Derek Hartl, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 245 days.

(21) Appl. No.: 14/327,602

(22) Filed: Jul. 10, 2014

(65) Prior Publication Data

US 2015/0025703 A1   Jan. 22, 2015

Related U.S. Application Data

(60) Provisional application No. 61/847,705, filed on Jul. 18, 2013.

(51) Int. Cl.
| | |
|---|---|
| G05F 1/66 | (2006.01) |
| B60L 3/00 | (2006.01) |
| B60L 3/12 | (2006.01) |
| B60L 11/18 | (2006.01) |
| H02H 3/00 | (2006.01) |

(Continued)

(52) U.S. Cl.
CPC .............. *G05F 1/66* (2013.01); *B60L 3/0046* (2013.01); *B60L 3/12* (2013.01); *B60L 11/1851* (2013.01); *H02H 3/006* (2013.01); *H02H 3/085* (2013.01); *H02H 5/04* (2013.01); *H02H 7/22* (2013.01); *H02H 9/02* (2013.01); *B60L 2240/545* (2013.01); *B60L 2240/549* (2013.01); *Y02T 10/705* (2013.01); *Y02T 10/7005* (2013.01)

(58) Field of Classification Search
CPC ..... B20W 20/00; B60L 11/00; B60L 11/1859; B60L 2220/00; B60L 2220/10; B60L 2220/40; B60L 3/12; B60L 3/0046; B60L 11/1851; B60L 2240/545; B60L 2240/549; H02K 47/04; B60K 1/00; B60K 6/445; G05F 1/66; H02H 3/006; H02H 3/085; H02H 5/04; H02H 7/22; H02H 9/02; Y02T 10/705; Y02T 10/7005; Y02T 10/6239; Y02T 10/6269; Y02T 10/6286; B60W 10/06; B60W 10/08; B60W 20/00; B60W 20/10; B60W 2520/10; B60W 2510/244
USPC ............. 700/286–296, 297–300; 701/22, 36; 180/65.265; 903/930
See application file for complete search history.

(56) References Cited

U.S. PATENT DOCUMENTS

| | | | |
|---|---|---|---|
| 8,718,849 B2 * | 5/2014 | Yamamoto ............ | B60K 6/445 180/65.265 |
| 2008/0103635 A1 * | 5/2008 | Vuk .................... | B60H 1/00828 700/300 |

(Continued)

*Primary Examiner* — Nga X Nguyen
(74) *Attorney, Agent, or Firm* — David B. Kelley; MacMillan, Sobanski & Todd, LLC

(57) ABSTRACT

A primary current threshold is fit between an electrical capacity and electrical load for an electrical distribution component. When a first measured current exceeds the primary threshold, a power limit for the battery powering the component is reduced. When a second measured current is less than a secondary current threshold, the power limit is increased. The primary and secondary thresholds may be set for a plurality of time periods.

16 Claims, 2 Drawing Sheets

(51) Int. Cl.
*H02H 3/08* (2006.01)
*H02H 5/04* (2006.01)
*H02H 7/22* (2006.01)
*H02H 9/02* (2006.01)

(56) References Cited

U.S. PATENT DOCUMENTS

2012/0091971 A1 4/2012 Syed et al.
2013/0204510 A1* 8/2013 Brinkmann ............ F02D 41/00
  701/103

* cited by examiner

CURRENT PROTECTION FOR AN ELECTRICAL DISTRIBUTION COMPONENT IN AN ELECTRIFIED VEHICLE

CROSS REFERENCE TO RELATED APPLICATION

This application claims priority to, and the benefit of, U.S. Provisional Application Ser. No. 61/847,705, filed Jul. 18, 2013, the full disclosure of which is incorporated herein by reference.

BACKGROUND OF INVENTION

The present invention relates to electrified vehicles and in particular to electrical current protection for high voltage electrical distribution components.

High voltage electrical distribution components in an electrified vehicle operate at a variety of loads. Most of the loads (for example, $90^{th}$ percentile loads) are well within the capacity of the electrical components while some higher loads (for example, $95^{th}$ or $99^{th}$ percentile loads) may be near the capacity of the electrical components. Such operation near capacity of the components due to the occasional higher loads may be reduced by increasing an electrical capacity of the components.

However, increasing the electrical capacity may also increase costs of the components. It is desirable to improve durability of the components when operating at the higher loads without increasing costs of the components.

SUMMARY OF INVENTION

An embodiment contemplates a current protection method for protecting an electrical distribution component in an electrified vehicle. Primary and secondary current thresholds are set based on electrical capacity and load for the component. A first power limit is reduced for a battery powering the component when a first root mean square current exceeds the primary threshold. The reduced power limit is increased when a second root mean square current is less than the secondary threshold.

Another embodiment contemplates a current protection method for protecting an electrical distribution component in an electrified vehicle. Primary and secondary current thresholds are set for a plurality of time periods. A power limit for a battery powering the component is reduced when, for any of the time periods, a first current exceeds the corresponding primary threshold. The reduced power limit is increased when, for all of the time periods, a second current is less than the corresponding secondary threshold.

An advantage of an embodiment is improving durability of the components without adding cost due to increasing the electrical capacity of the components.

DETAILED DESCRIPTION

Figure 1:
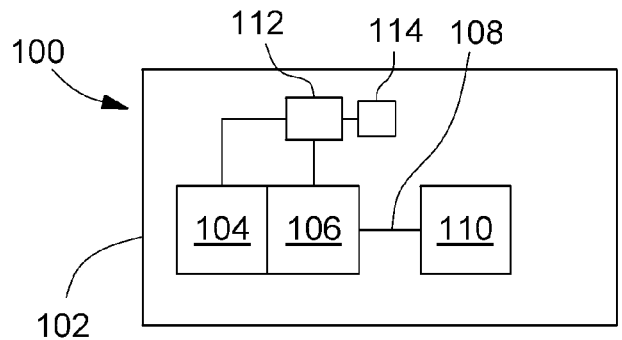
FIG. 1 is a schematic diagram of a high voltage electrical distribution system for an electrified vehicle.

FIG. 1 illustrates a high voltage electrical distribution system (EDS) 100 for an electrified vehicle 102. A high voltage battery 104 is electrically connected to an EDS component 106. As understood by one skilled in the art, the battery 104 may be comprised of a plurality of electrochemical cells. The EDS component 106 may comprise wiring, connectors, contactors, a bussed electrical center (BEC), a fuse, or other under hood connectors. The EDS component 106 is powered by the battery 104. Electrically connected to the EDS component 106, via a high voltage bus 108, is a vehicle high voltage system 110. For example, the high voltage system 110 may be a traction motor for propelling the vehicle 102. A controller 112, such as a battery electronic control module, monitors the EDS component 106 and adjusts power limits of the battery 104. For example, the power limits may include a discharge limit or a charging limit. The controller 112 interfaces with a data store 114.

Figure 2:
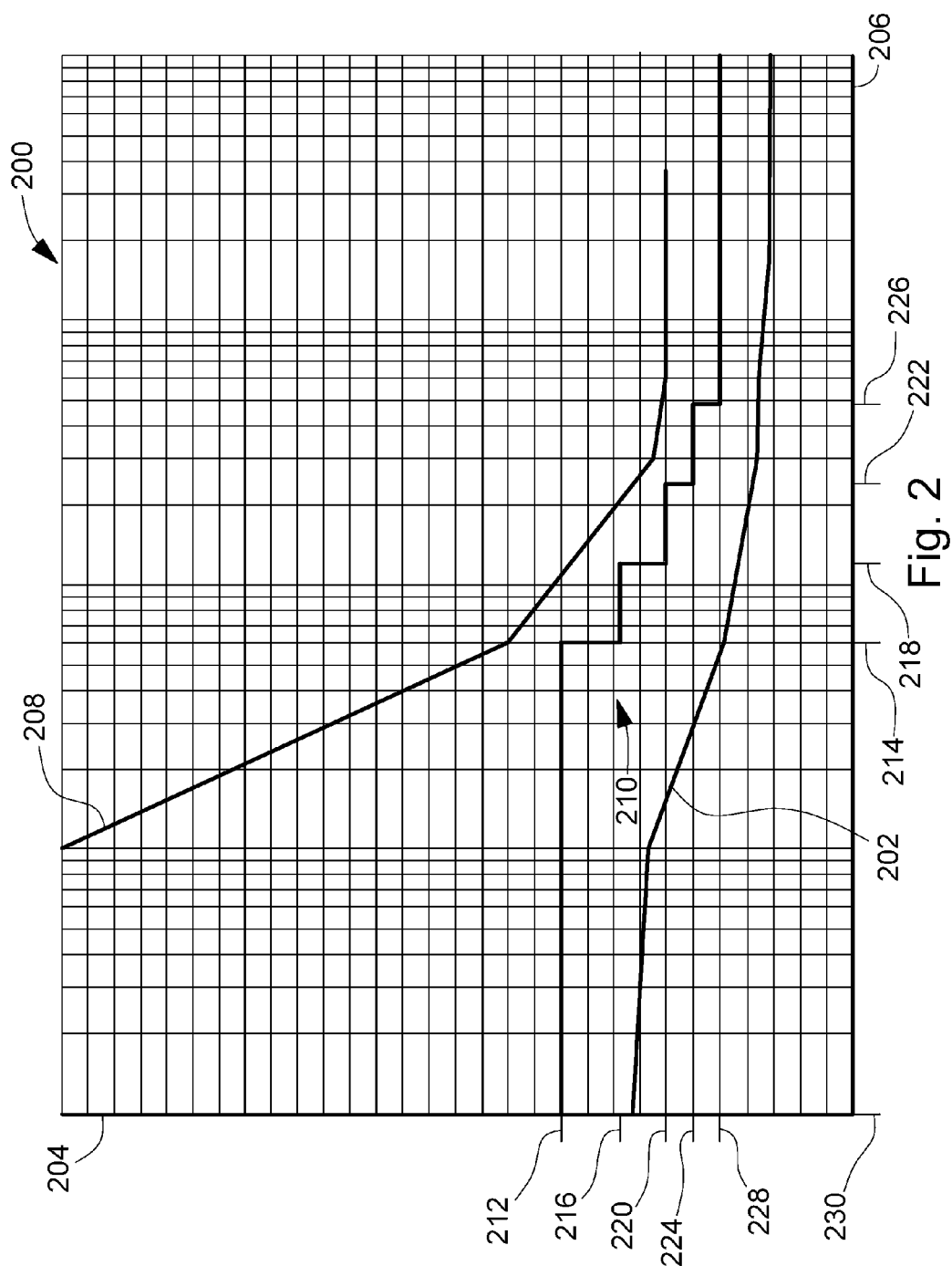
FIG. 2 is a graph of electrical load for a component of the electrical distribution system of FIG. 1.

FIG. 2 will now be discussed with reference to FIG. 1. FIG. 2 illustrates, in a graph 200, an electrical load 202, measured by the controller 112, for the EDS component 106. The vertical axis 204 is electric current and the horizontal axis 206 is time on a logarithmic scale. The load 202 is current 204 at time 206. For example, the load 202 may be a $90^{th}$ percentile load for the EDS component 106. Also illustrated are an electrical capacity 208 of the EDS component 106 and a primary current threshold 210.

The primary threshold 210 may be comprised of a plurality of thresholds corresponding to time periods. As illustrated, as a non-limiting example, the primary threshold 210 may be comprised of a first primary threshold 212 for a first time period 214, a second primary threshold 216 for a second time period 218, a third primary threshold 220 for a third time period 222, and a fourth primary threshold 224 for a fourth time period 226. Following the fourth time period 226, the primary threshold 210 is held at a fifth primary threshold 228. As understood by one skilled in the art, the plurality of thresholds corresponding to time periods may vary, including less than five time periods or more than five time periods. The time periods are moving average windows and start concurrently at a zero time 230. The zero time 230 may be, for example, when a driver starts the vehicle 102.

The primary threshold 210 and time periods are calibrated to the EDS component 106 and are fit between the electrical load 202 and the electrical capacity 208. For example, the primary threshold 210 should not be less than the electrical load 202 and sized to approach, without exceeding, the electrical capacity 208. The primary threshold 210 may be set based on predetermined time periods. For example, the primary threshold 210 may be set based on the predetermined time periods such that the primary threshold 210 is greater than the electrical load 202 while not exceeding the electrical capacity 208. Alternatively, the time periods may be set based on predetermined primary thresholds. For example, the time periods may be set, using the predetermined primary thresholds, such that the predetermined primary thresholds fall between the electrical load 202 and the electrical capacity 208.

Figure 3:
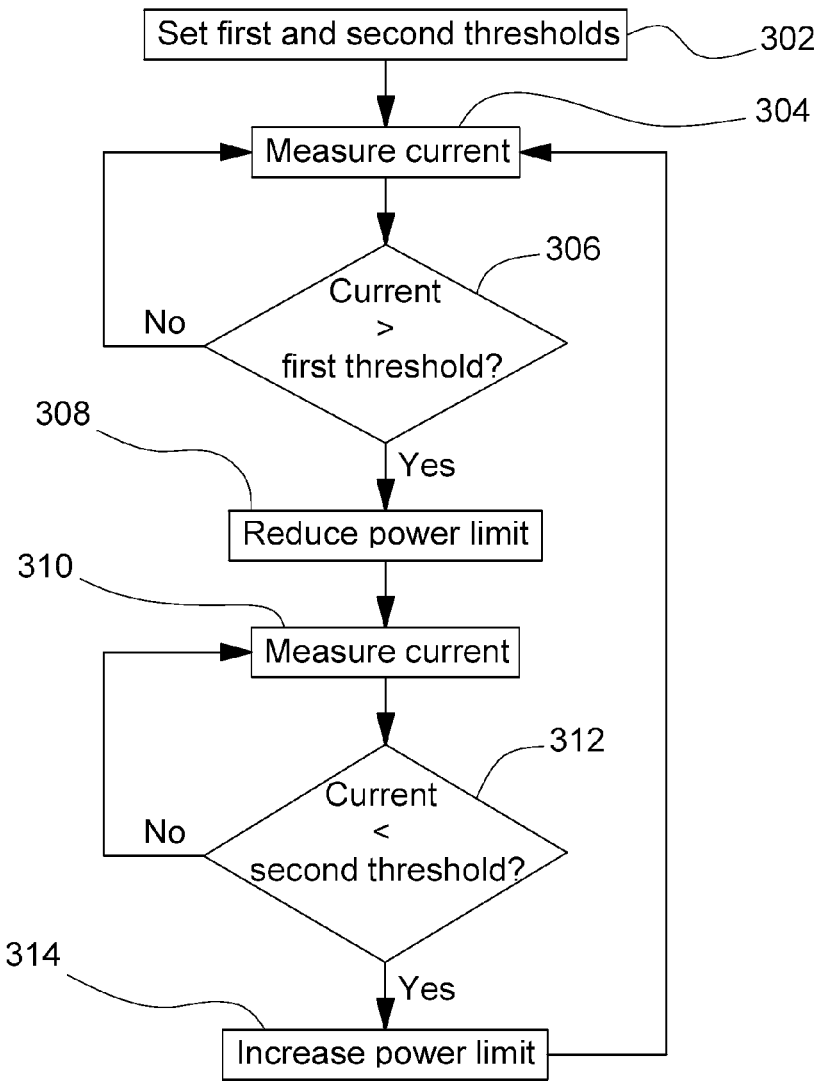
FIG. 3 is a flowchart of a current protection routine for an electrical distribution component.

FIG. 3 illustrates electrical current protection routine 300 and will be discussed with reference to FIG. 1 and FIG. 2.

In a step 302, the controller 112 sets the primary threshold 210. For example, the first primary threshold 212 may be 200 amps for the first time period 214 of 150 seconds, the second primary threshold 216 may be 170 amps for the second time period 218 of 250 seconds, the third primary threshold 220 may be 155 amps for the third time period 222 of 350 seconds, the fourth primary threshold 224 may be 145 amps for the time period 226 of 500 seconds, and the fifth primary threshold 228 may be 135 amps.

Also, in the step 302, the controller sets a secondary threshold. The secondary threshold, for each of the time periods, may be less than the primary threshold 210 for the same time period. For example, the first secondary threshold may be 190 amps for the first time period 214, the second secondary threshold may be 161.5 amps for the second time period 218, the third primary threshold may be 147.3 amps for the third time period 222, the fourth primary threshold may be 137.8 amps for the time period 226, and the fifth primary threshold may be 128.3 amps.

Alternatively, the secondary threshold may be equal to the primary threshold, including for each of the time periods.

The secondary threshold may be set based on temperature. That is, a reference secondary threshold may be adjusted based on temperature. For example, for temperature less than or equal to −10 degrees Celsius, the reference secondary threshold may be adjusted by a factor of 1.2, for temperature greater than −10 degrees Celsius and less than or equal to 10 degrees Celsius the reference secondary threshold may be adjusted by a factor of 1.1, for temperature greater than 10 degrees Celsius and less than or equal to 30 degrees Celsius the reference secondary threshold may be adjusted by a factor of 1.0, and for temperature greater than 30 degrees Celsius the reference secondary threshold may be adjusted by a factor of 0.8. A temperature used with the reference secondary threshold may be a measured ambient temperature or inferred temperature. Alternatively, the temperature used may be a temperature measured at a worst case location, as understood by one skilled in the art, of the EDS 100. Alternatively, the temperature used may be an internal environment temperature of the battery 104 or an engine compartment of the vehicle 102. Multiple temperatures may be measured and a worst case temperature, as understood by one skilled in the art, used.

In a step 304, the controller 112 measures the electrical load 202 for the EDS component 106 as a first measured current. The first measured current is a root mean square current for each of the time periods. The first measured current is recorded in the data store 114.

In a step 306, the controller 112 compares the first measured current to the primary threshold 210. When the first measured current does not exceed the primary threshold, for any of the time periods, then the routine 300 returns to the step 304. When the first measured current does exceed the primary threshold, for any of the time periods, then the routine 300 proceeds to a step 308.

In the step 308, the controller 112 reduces the power limit to a reduced power limit. The reduced power limit may be set using a reduction amount corresponding to the time period for which the first measured current exceeded the first threshold 210. For example, the first primary threshold 212 may correspond to the reduction amount of 68%, the second primary threshold 216 may correspond to 57%, the third primary threshold 220 may correspond to 51%, the fourth primary threshold may correspond to 46%, and the fifth primary threshold may correspond to 42%. When the first measured current exceeds the first threshold 210 for more than one time period, the power limit is reduced by the greatest reduction amount corresponding to one of the time periods for which the first measured current exceeds the first threshold 210.

In a step 310, the controller 112 again measures the electrical load 202 for the EDS component 106 as a second measured current. The second current is also a root mean square current for each of the time periods. The electrical load 202 is continuously sampled, for example every 2 milliseconds, and the moving average windows are continuously updated. The second current is measured by determining the latest sampled current and recalculating each value of the moving average window. The second measured current is also recorded in the data store 114.

In a step 312, the controller 112 compares the second measured current to the secondary threshold. When the second measured current does not exceed the secondary threshold for all of the time periods, then the routine 300 proceeds to the step 314. When the second measured current does exceed the secondary threshold for any of the time periods, then the routine 300 returns to the step 310 and may set a diagnostic flag. The diagnostic flag may, for example, cause a driver alert, convert vehicle operation to a limp home mode, or disable operation of the vehicle 102. The second threshold may be set differently from the first threshold to prevent hysteresis—i.e., the routine 300 too frequently adjusting the power limit.

In a step 314, the controller 112 increases the reduced power limit. The controller 112 may increase the reduced power limit to equal the power limit prior to the step 308. Following the step 314, the routine 300 returns to the step 304.

The first and second measured currents from a first cycle of the routine 300, recorded in the data store 114, may be used with a second cycle of the routine 300. For example, the first and second measured currents from the first cycle may be used to further decrease power limits if a subsequent measured current is still increasing.

As one skilled in the art will recognize, the routine 300 may be separate from any fuse protection for the EDS component 106.

While certain embodiments of the present invention have been described in detail, those familiar with the art to which this invention relates will recognize various alternative designs and embodiments for practicing the invention as defined by the following claims.

The invention claimed is:

1. A method of current protection in an electrified vehicle comprising:
 (a) reducing, via a controller, a first power limit of a battery powering an electrical distribution component when a first root-mean-square current flowing through the component exceeds a primary threshold, the primary threshold and a secondary current threshold being based on an electrical capacity and load for the component;
 (b) if the first power limit of the battery is reduced in step (a), increasing, via the controller, the battery power limit from the reduced power limit when a second root-mean-square current flowing through the component is less than the secondary threshold.

2. The method of claim 1 further comprising the step of: setting the secondary threshold based on temperature.

3. The method of claim 1 further comprising the step of: recording the first and second currents from a first power cycle for use with a second power cycle.

4. The method of claim 1 further comprising the step of: using the component to supply electricity to a traction motor propelling the vehicle.

5. A method of current protection in an electrified vehicle comprising:
 (a) reducing, via a controller, a power limit for a battery powering an electrical distribution component when, for any time periods corresponding to primary current thresholds, a first current flowing through the component exceeds the corresponding primary threshold, the primary threshold and a secondary current threshold based on an electrical capacity and load for the component;

(b) if the power limit of the battery is reduced in step (a), increasing, via the controller, the battery power limit from the reduced power limit when, for all of the time periods, which have corresponding secondary current thresholds, a second current is less than the corresponding secondary threshold.

6. The method of claim 5 further comprising the step of: setting the primary and secondary thresholds based on an electrical capacity of the component.

7. The method of claim 5 further comprising the step of: setting the primary and secondary thresholds based on an electrical load for the component.

8. The method of claim 5 further comprising the step of: setting the primary and secondary thresholds based on electrical capacity and load for the component.

9. The method of claim 5 further comprising the step of: setting the secondary threshold based on temperature.

10. The method of claim 5 further comprising the step of: reducing the power limit based on the time period for which the first current exceeds the corresponding primary threshold.

11. The method of claim 5 further comprising the step of: reducing the power limit based on the time period giving a greatest reduction in the power limit, when the first current exceeds the corresponding primary threshold for more than one time period.

12. The method of claim 5 further comprising the step of: recording the first and second currents from a first power cycle for use with a second power cycle.

13. The method of claim 5 further comprising the step of: setting a diagnostic flag when one of the second currents exceeds the secondary threshold.

14. The method of claim 5 further comprising the step of: disabling operation of the electrified vehicle when one of the second currents exceeds the secondary threshold.

15. The method of claim 5 wherein the first and second currents are calculated as root-mean-square currents for the time periods.

16. The method of claim 5 further comprising the step of: using the component to supply electricity to a traction motor propelling the vehicle.

* * * * *